United States Patent [19]

Fritsche et al.

[11] 4,455,755
[45] Jun. 26, 1984

[54] APPARATUS FOR SENSING TEST VALUES AT TEST SAMPLES

[75] Inventors: Rainer Fritsche, Braunfels; Hans-Dieter Jacoby, Werdorf; Erich Schüster, Hüttenberg, all of Fed. Rep. of Germany

[73] Assignee: Ernst Leitz Wetzlar GmbH, Wetzlar, Fed. Rep. of Germany

[21] Appl. No.: 418,048

[22] Filed: Sep. 14, 1982

Related U.S. Application Data

[63] Continuation of Ser. No. 183,725, Sep. 3, 1980, abandoned.

[30] Foreign Application Priority Data

Sep. 15, 1979 [DE] Fed. Rep. of Germany ....... 2937431

[51] Int. Cl.³ .............................................. G01B 7/02
[52] U.S. Cl. .................................................. 33/174 L
[58] Field of Search ............. 33/172 E, 174 L, 169 R, 33/174 Q

[56] References Cited

U.S. PATENT DOCUMENTS

| | | | |
|---|---|---|---|
| 3,164,909 | 1/1965 | Rosenberg | 33/174 L |
| 4,078,314 | 3/1978 | McMurtry | 33/174 L |
| 4,136,458 | 1/1979 | Bell et al. | 33/174 L |
| 4,177,568 | 12/1979 | Werner et al. | 33/174 L |

FOREIGN PATENT DOCUMENTS

| | | | |
|---|---|---|---|
| 2052213 | 1/1972 | Fed. Rep. of Germany | 33/172 E |
| 2408813 | 7/1979 | France | 33/174 L |
| 599534 | 5/1978 | Switzerland | 33/174 L |
| 2006435 | 5/1979 | United Kingdom | 33/172 E |

Primary Examiner—Harry N. Haroian
Attorney, Agent, or Firm—Wells & Wells

[57] ABSTRACT

Apparatus for sensing test values at test samples which uses an elastically supported mechanical sensor (3) moving relative to test samples (4) and at least one test value transmitter (11) with counter (9) detecting the relative motion between the sensor (3) and the test samples. At the instant of impact between sensor (3) and the test samples (4), a signal is generated which is used to store the test value present at the test value transmitter (11) at the instant of impact between the sensor (3) and the test samples (4) into a memory (13a,13b). The sensor consists of one part (2') which is fixed to the housing and other part (2") which is movable with respect to the fixed one. An oscillation or acceleration pickup (10) is mounted externally to the moving part (3) and generates the signal required to store the test value.

A circuit (14) is provided to the oscillation or acceleration pickup (10) to distinguish between actual sensing signals and spurious ones. This circuit (14) selects any spurious signals from the sensed (test) signal and controls the data flow between the memory (13a,13b) and a subsequent computer (16) for analyzing the test signals.

11 Claims, 11 Drawing Figures

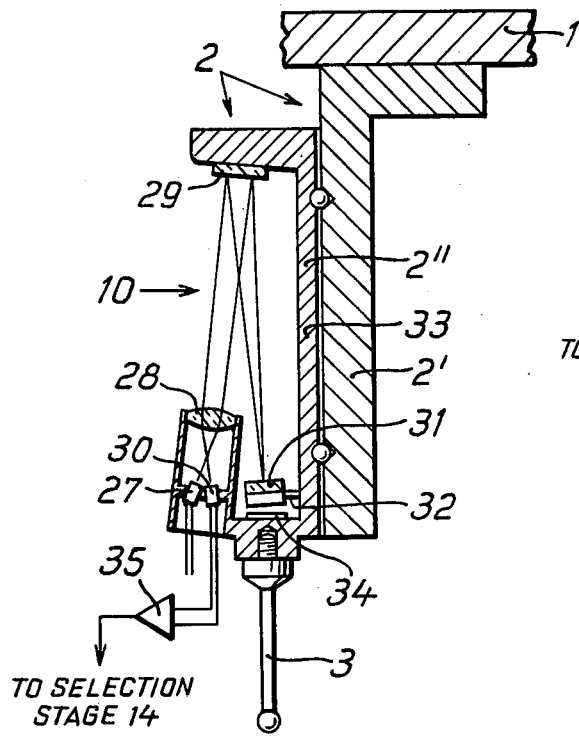
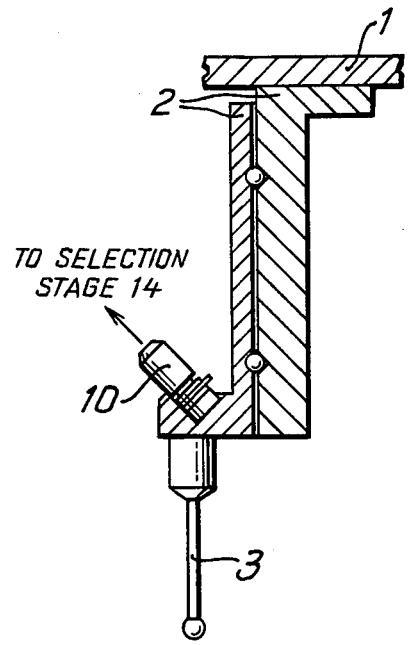
Fig. 4
Fig. 9
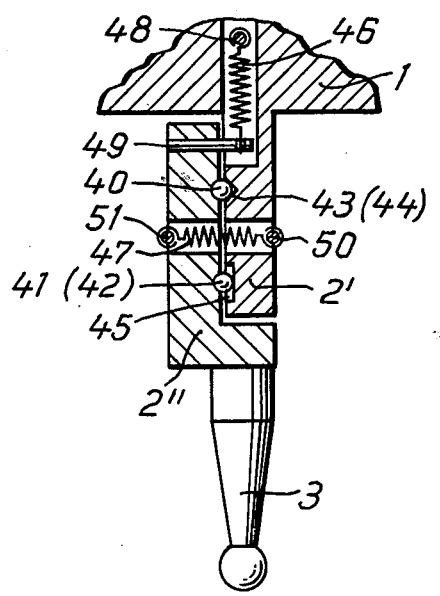
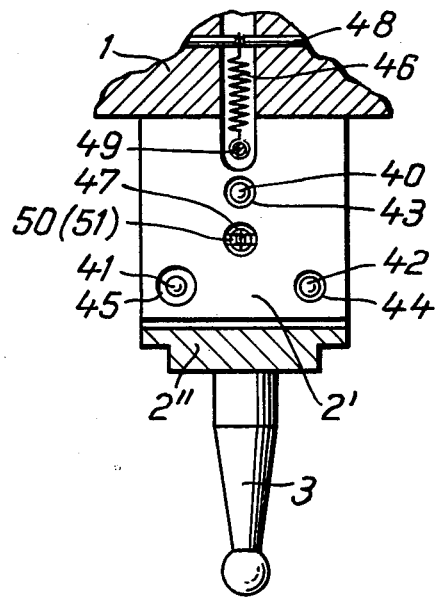
Fig. 4a
Fig. 4b

APPARATUS FOR SENSING TEST VALUES AT TEST SAMPLES

This is a continuation of application Ser. No. 183,725, filed Sept. 3, 1980, now abandoned.

CROSS REFERENCE TO RELATED APPLICATION

Applicants claim priority under 35 U.S.C. 119 for application No. P 29 37 431.0, filed Sept. 15, 1979 in the Patent Office of the Federal Republic of Germany.

BACKGROUND OF THE INVENTION

The field of the invention is geometrical instruments having pivoted contacts and the present invention is particularly concerned with apparatus for sensing the test results at test samples, using an elastically supported mechanical sensor moved relative to the test samples. At least one test-value transmitter detects the relative motion between the test sample and the sensor. A counter follows the sensor and a signal is generated in the apparatus at the instant of impact between the sensor and the test sample, this signal then being stored in a memory. The memory stores the test value present at the test-value transmitter at the instant of impact.

The state of the art of contact sensors may be ascertained by reference to U.S. Pat. Nos. 3,905,119 and 3,945,124; West German Pat. No. 2,440,692; West German Published Application No. 1,804,253 and West German Utility Pat. Nos. 7 231 877 and 7 400 071, the disclosures of which are incorporated herein.

West German patent application No. 2,820,813 of Hans-Dieter Jacoby and Erich Schuster published Nov. 15, 1979 and not yet a part of the prior art on the German priority date of the present application, is incorporated herein because it discloses a method and apparatus having a mechanical sensor which moves relative to the test sample and which comprises at least one test-value transmitter with counter. This method and apparatus are characterized in that at the time of impact between the test sample and the sensor, a signal is generated and this signal is stored in a memory so that the test value at the test-value transmitter is stored at the time of impact. FIG. 2 of West German Published Application No. 2,820,813 in combination with FIGS. 5 and 6, show how the three coordinate data for the sample is obtained.

SUMMARY OF THE INVENTION

It is the object of the present invention to further develop the apparatus disclosed in West German Published Application No. 2,820,813.

This object is achieved in an apparatus having a sensor consisting of a portion fixed to the housing and a one-piece second portion moving relative to the fixed portion. At least one oscillation or acceleration pickup is externally mounted on the movable second portion, this pickup emitting a signal at the time of impact between the sensor and test sample. This signal is used to cause the recording of the test value at the test-value transmitter.

In one embodiment, a microphone is used as the oscillation or acceleration pickup.

However, in another embodiment, a piezoelectric element is used as the oscillation or acceleration pickup.

In a further embodiment, the oscillation or acceleration pickup consists of a capacitive or inductive transducer. Still another embodiment uses an electro-optical transducer as the oscillation or acceleration pickup.

In order to obtain amplitudes as equal as possible for the oscillations generated along test axes x, y and z when the contour of the test sample is sensed, it is proposed that the oscillation or acceleration pickup be inclined at 45° to all the test axes.

It is noted that in an apparatus such as West German Published Application No. 2,820,813, measuring data recording may be caused by other signals, for instance acoustic waves as spurious signals other than the signal from the test-sample sensing.

In order to discriminate between such a spurious signal and the actual sensing signal and to separate them, the present invention in a further development provides a circuit for the oscillation or acceleration pickup, which is selective between spurious signals and the test signal and which controls the data flow from the memory to a computer following it.

Such a circuit consists of a first full-wave rectifier, a differentiator, a second full-wave rectifier, a summing amplifier and a cycle control stage. In this circuit, the output signal from the oscillation or acceleration pickup is fed to the first full-wave rectifier after passing through a differentiator. The outputs of the full-wave rectifier are connected to the inputs of the summing amplifier, which is followed by the cycle control stage.

An additional circuit stage is provided in a further development of the present invention, which forms correction values from the output signal of the oscillation or acceleration pickup and the output signal of the summing amplifier and the speed data from the table and sensor motion, these correction values being fed to the computer and the display unit.

In place of the additional circuit stage, a second oscillation or acceleration pickup is mounted in spaced relationship to the first one, the output signals of this second pickup being processed in a second selection stage. Together with the output signals from the first selection stage, the output signals are fed to a blocking stage that releases the data flow between memory and computer only when a signal from the first selection stage is present and a signal from the second selection stage is absent.

BRIEF DESCRIPTION OF THE DRAWING

The appended drawings illustrate various embodiments of the present invention schematically wherein:

FIG. 4 is a front view in cross section of an embodiment of the present invention wherein an electro-optical generator is used as an oscillation or acceleration pickup;

FIG. 4a is a cross-sectional side view of the flexible joint;

FIG. 4b is a front view (intersected) of the flexible joint;

FIG. 9 is another embodiment of FIG. 4 where the oscillation or acceleration pickup is positioned at an angle of 45° to the test axes of the sensor.

DESCRIPTION OF THE PREFERRED EMBODIMENTS

Figure 1:
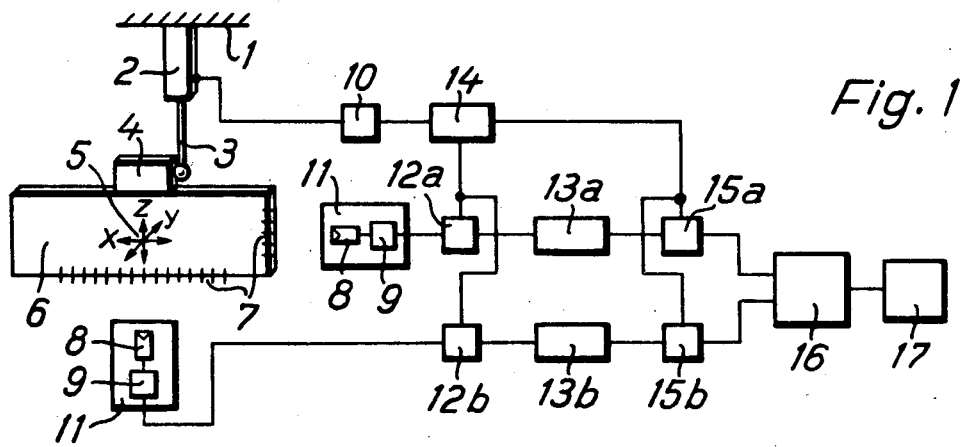
FIG. 1 is a schematic block diagram of an apparatus and circuitry of the present invention.

With particular reference to FIG. 1, a flexible joint 2 is shown acting as an overload relief and having a support to which it is connected. The concept of flexible joint 2 is according to the principles disclosed pp 48 to 57 in POLLERMANN's "Bauelemente der physikalischen Technik" edited 1955 by Springer-Verlag, Berlin.

A one-piece sensor 3 is located on the flexible joint 2, by means of which sensor a test sample 4 is tested. The flexible joint 2 has a first portion 2' which is rigidly connected to the housing 1 and a second portion 2'' which moves relative to the fixed portion. This test sample is mounted on a testing table 6 which is adjustable in the direction of arrows 5 which also represent the testing axes x, y, z. Testing table 5 is provided with graduations 7 in the directions of the testing axes x, y, z and these graduations together with the photoelectric detectors 8 and the counters 9 are the components of each test-value transmitter 11. For the sake of clarity, only two test-value transmitters 11 are shown. When the testing table 6 is displaced in one of the arrow directions, electric pulses are generated in the corresponding test-value transmitter 11 and these pulses are counted by the counter 9 located within the test value transmitter.

Figure 7:
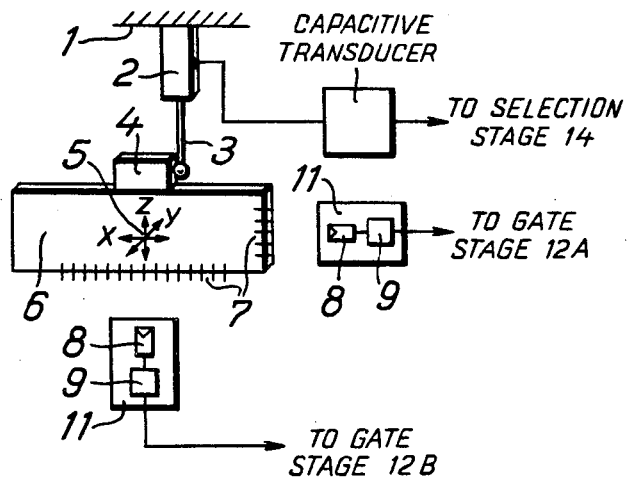
FIG. 7 is another embodiment of FIG. 4 where a capacitive transducer is used.
Figure 8:
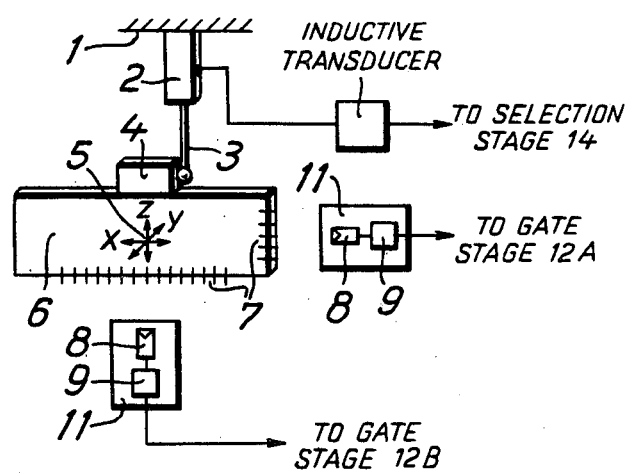
FIG. 8 is another embodiment of FIG. 4 where an inductive transducer is used.

In order to store the test values present at the time of contact between the sensor 3 and the test sample 4 at the test-value transmitters 11, the sensor 3 is connected to an oscillation or acceleration pickup 10, for example, a microphone (FIG. 5), a piezoelectric element (FIG. 6) or a capacitive (FIG. 7) or inductive transducer (FIG. 8). As shown in FIG. 9 pickup 10 is preferably set at an angle of 45° to the test axes x, y, z externally to the sensor 3 and emits a signal at the instant of contact whereby the counters 9 in the test-value transmitters 11 are stopped and simultaneously the relative motion between test sample 4 and the sensing means is switched off.

For the temporary storage of the values present in the counters 9, memories 13a and 13b are connected by means of the gate stages 12a and 12b to these counters 9. The control of the gate stages 12a and 12b is obtained from the signals of one of the outputs of a selection stage 14. The particular value present in the counters 9 for instance is transferred into the memories 13a and 13b when the oscillation process begins.

The selection stage 14 is discussed in further detail below and it is connected to the oscillation or acceleration pickup 10. It selects from and discriminates against signals that might cause the transfer of a test value not due to sensing into the computer 16, and after separating the spurious signal from the sensor signal, it generates an output signal which by opening gates 15a and 15b releases the test value stored in the memories 13a and 13b for processing in computer 16. The end result obtained there is fed to a display unit 17.

It is found that the oscillation generated in the sensing process differs basically from that due to spurious causes. This difference makes it possible to so discriminate between these oscillations that only those signals generated from the actual sensing process will release the test values for computation and/or display. An example of a selection stage 14 operating in this manner is provided in FIG. 2.

Figure 2:
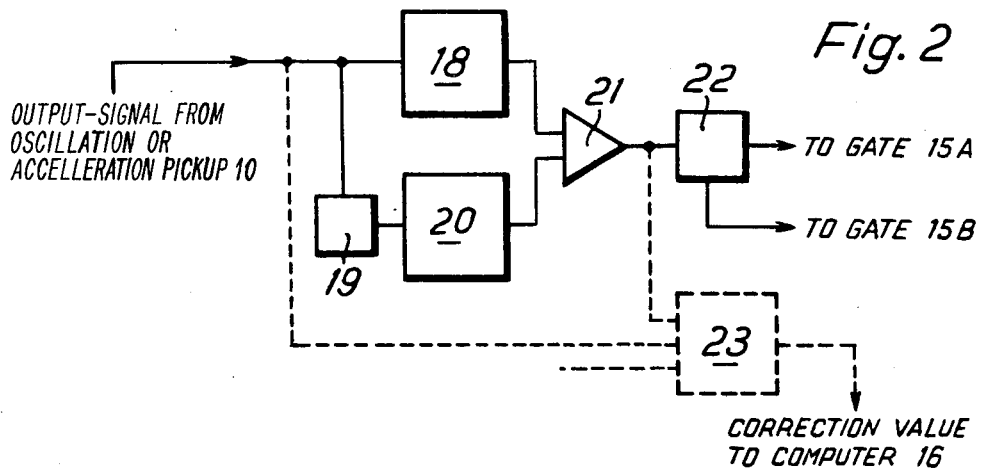
FIG. 2 shows an embodiment of a circuit diagram used in the discriminating stage of FIG. 1.

The output signal from the oscillation or acceleration pickup 10 is fed in the discriminating stage of FIG. 2 to first and second circuit branches. The first circuit branch consists of a full-wave rectifier 18, as disclosed for instance in HALBLEITERSCHALTUNGSTECHNIK by U. Tietze & Ch. Schenk, Springer publishers, 1978, p. 656, paragraph 25.11, or in the HANDBOOK OF OPERATIONAL AMPLIFIER APPLICATIONS, Burr Brown Research Corp., Tucson, Ariz. 1963.

The second circuit branch of the selection stage 14 contains a differentiator 19 and another full-wave rectifier 20.

Both the differentiated and the undifferentiated signals are subjected to full-wave rectification in the full-wave rectifiers 18, 20. The output signals from these circuits 18, 20 are summed again by a further summing amplifier 21.

The output signal from the summing amplifier 21 is always different from zero when there is an oscillation process. It is found that the oscillation caused by sensing the test sample 4 is decaying, whereas that from spurious causes is sporadic and statistical.

Thus, when spurious effects are present, there is a signal differing from null at the output of the summing amplifier only for a very short time and sometimes intermittently. By means of a cycle-control stage 22 following the summing amplifier 21, an interrogation is carried out whether for a specific time, for instance, 10 msec, continuous output signal different from null is present at the output of the summing amplifier 21. When this is the case, the signal is due to sensing. Thereupon, a signal generated by the cycle control stage 22 opens gates 15a and 15b, releasing the data flow between memories 13a and 13b and the computers 16.

When the signal at the output of the summing amplifier 21 is intermittent, then it is spurious. In this case, the signal present at the cycle-control stage 22 does not open the gates 15a and 15b and there is no transfer of the test values stored in memories 13a and 13b to the computer 16.

As indicated in dashed lines in FIG. 2, the selection stage 14 is provided with a circuit 23 generating correction values fed to the computer 16 and to the display unit 17. The output signals from the oscillation or acceleration pickup 10 and those from the summing amplifier 21 are fed into the circuit 23 to form the correction values. Furthermore, speed data regarding the motion of table 6 and/or the sensor 3 are also fed to the circuit 23.

Figure 3:
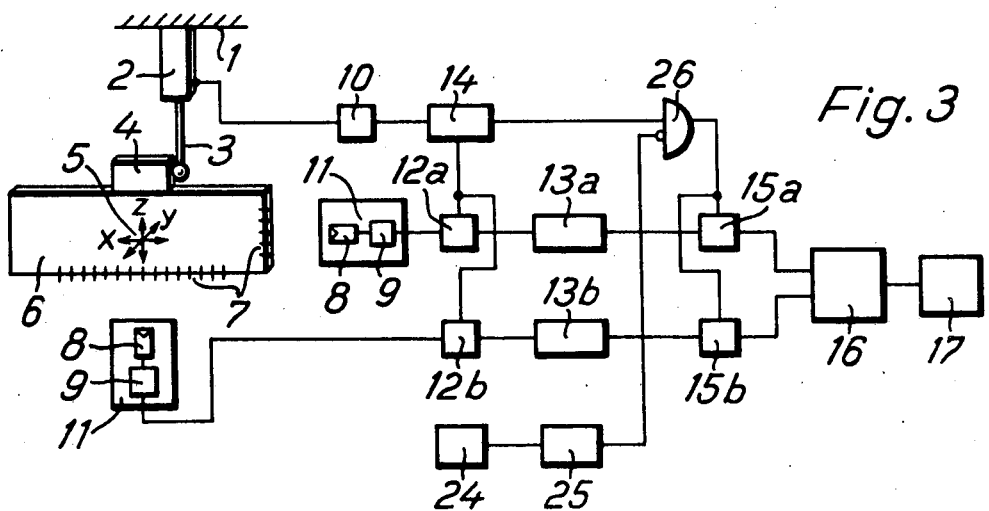
FIG. 3 is a schematic block diagram of another embodiment of the apparatus and circuitry of the present invention showing a second oscillator or accelerator pickup.

FIG. 3 shows another example for eliminating signals that might cause the transfer of a test value not due to sensing the test sample 4 into the computer 16.

In this case, a second oscillation or acceleration pickup 24 is mounted as close as possible to the first oscillation or acceleration pickup 10 and sensor 3. Each of these pickups 10 and 24 is followed by a selection stage 14 and 25, respectively. The selection stage 25 differs from the selection stage 24 by comprising a single output. The signal from the second oscillation or acceleration pickup 24 is analyzed by the selection stage 25 and stored for a predetermined time as a spurious signal. Accordingly a blocking stage 26 of which one input is connected with the selection stage 14 and the other input with the selection stage 25 will remain closed. Thereby, the transfer of the data from the memories 13a and 13b, respectively to the computer 16 and/or display 17 remains blocked as the gates 15a and 15b remain closed. The blocking stage 26 only transmits when there is a signal from the sensing process, that is, from the selection stage 14.

Figure 5:
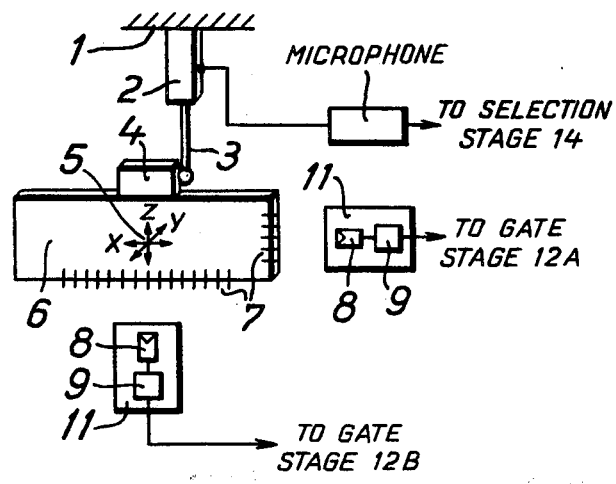
FIG. 5 is another embodiment of FIG. 4 where a microphone is used.
Figure 6:
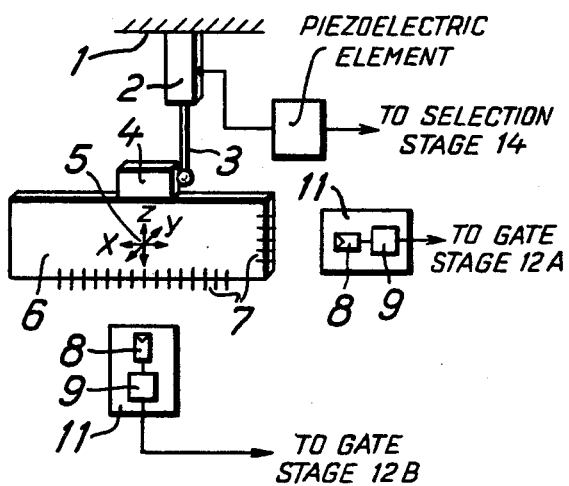
FIG. 6 is another embodiment of FIG. 4 wherein a piezoelectric element is used.

In the schematically shown embodiment of FIG. 4, where the electro-optical transducer is the oscillation or acceleration pickup, the fixed housing 1 bears a flexible joint 2 as disclosed in FIGS. 5 and 6 of West German Published Patent Application No. 28 20 813. As shown in FIGS. 4a and 4b of the invention such a joint is composed of a first portion 2' rigidly connected to the housing 1 and a second one piece portion 2" bearing sensor 3. Balls 40, 41, and 42, are fixedly embedded in the inner side of portion 2".

Portion 2' is provided with recesses 43, 44, and 45, at least one of them being of conical or prismatic shape while the rest is formed cylindrically with a planar bottom surface. Recesses 43–45 receive balls 40–42.

Thus, portion 2" is supported by portion 2'. For flexibly joining both portions, springs 46 and 47 suspended on holding pins 48 and 49 and 50 and 51, respectively, are provided. Supports of such structure assure shunting of the probe at overload. The flexible joint 2 contains an electro-optical testing system consisting of a spatially fixed light emitter 27, a spatially fixed optics 28, a fixed mirror 29, a spatially fixed differential photodetector 30 and a movable mirror 31 mounted by an elastic connecting means 32 to a piece 33 of flexible joint 2.

The above described system operates as follows: the light emitter 27, for instance a GaAs diode, is located at the focal point of the optics 28, whereby the radiation emitted by the light source 27 is collimated when incident on the fixed mirror 29 and the movable mirror 31. Mirror 31 reflects the light. The optics 28 focuses it onto the differential photodetector 30.

For the rest condition of the apparatus, the reflected light beam is centrally focused onto the differential photodetector 30. A coil 34 may be provided for fine adjustment.

When the sensor 3 touches the workpiece 4, the elastically supported mirror is made to oscillate. Because of the resulting deflection of the light spot on the differential photo detector 30, one of the detector's outputs will have a larger signal and the other a smaller one. Both signals are fed to a subsequent differential amplifier 35 of which the output signal then is analyzed, as already described above.

In the schematically shown embodiment of FIG. 9, the housing 1 bears a flexible joint 2. As in FIG. 4, the flexible joint 2 comprises a first portion 2' which is rigidly connected to the housing 1 and a second one piece portion 2" which is elastically connected to the first portion. An oscillation or acceleration pick-up 10 is mounted on the second one piece portion 2" of the flexible joint 2 and positioned thereon at an angle of 45° to the test axes of the apparatus. For the sake of clarity, only the position of pick-up 10 with respect to one of the test axes is shown.

We claim:

1. An apparatus for sensing a test value at a test sample (4) comprising:
   (a) an elastically supported mechanical sensor (3) which moves relative to said test sample;
   (b) at least one test value transmitter (11) detecting the relative motion between said test sample (4) and said sensor (3) and having a subsequent counter (9);
   (c) a flexible joint (2) comprising a first portion (2') which is rigidly connected to a housing (1) and a second one-piece portion (2") which moves relative to said fixed portion, said second one-piece portion elastically and movably supported on said first one-piece portion, said sensor (3) located on said second one-piece portion;
   (d) at least one oscillation pick-up (10) mounted on said second one-piece portion, said pick-up emitting a signal at the instant of impact between said sensor (3) and said test sample (4); and
   (e) at least one memory (13a, 13b) activated by said signal and storing a test value present at said test value transmitter (11).

2. An apparatus for sensing a test value at a test sample (4) comprising:
   (a) an elastically supported mechanical sensor (3) which moves relative to said test sample;
   (b) at least one test value transmitter (11) detecting the relative motion between said test sample (4) and said sensor (3) and having a subsequent counter (9);
   (c) a flexible joint (2) comprising a first portion (2') which is rigidly connected to a housing (1) and a second one-piece portion (2") moves relative to said fixed portion, said second one-piece portion elastically and movably supported on said first one-piece portion, said sensor (3) located on said second one-piece portion;
   (d) at least one acceleration pick-up (10) mounted on said second one-piece portion, said pick-up emitting a signal at the instant of impact between said sensor (3) and said test sample (4); and
   (e) at least one memory (13a, 13b) activated by said signal and storing a test value present at said test value transmitter (11).

3. The apparatus of claims 1 or 2, further comprising said pick-up (10) having a circuit (14) discriminating spurious signals from said signal and said circuit controlling data flow between a memory (13) and a subsequent computer (16), said circuit (14) comprising a first full-wave rectifier circuit (18), a differentiator (19), a second full-wave rectifier (20), a summing amplifier (21) and a cycle control stage (22), wherein said signal from said pick-up (10) after passing through said differentiator (19) is fed to said second full-wave rectifier circuit (20) and wherein the outputs from the full-wave rectifier circuits (18, 20) are connected to the inputs of said summing amplifier (21) which is prior to said cycle control stage (22).

4. The apparatus of claim 1 or 2, further comprising said pick-up (10) having a circuit (14) discriminating spurious signals from said signal and said circuit controlling data flow between a memory (13) and a subsequent computer (16), said circuit (14) comprising a first full-wave rectifier circuit (18), a differentiator (19), a second full-wave rectifier (20), a summing amplifier (21) generating an output signal and a cycle control stage (22), wherein said signal from said pick-up (10) after passing through said differentiator (19) is fed to said second full-wave rectifier circuit (20) and wherein the outputs from the full-wave rectifier circuits (18, 20) are connected to the inputs of said summing amplifier (21) which is prior to said cycle control stage (22), a circuit stage (23) forming correction values from said signal of said pick-up (10) and said output signal of said summing amplifier (21) and speed data relating to the motion of a table (6) and said sensor (3), said correction values being fed to said computer (16) and a display unit (17).

5. The apparatus of claims 1 or 2, further comprising said pick-up (10) having a circuit (14) discriminating spurious signals from said signal and said circuit controlling data flow between a memory (13) and a subsequent computer (16), said circuit (14) comprising a first full-wave rectifier circuit (18), a differentiator (19), a second full-wave rectifier (20), a summing amplifier (21) generating an output signal and a cycle control stage (22), wherein said signal from said pick-up (10) after passing through said differentiator (19) is fed to said second full-wave rectifier circuit (20) and wherein the outputs from the full-wave rectifier circuits (18, 20) are connected to the inputs of said summing amplifier (21) which is prior to said cycle control stage (22), a circuit stage (23) forming correction values from said signal of said pick-up (10) and said output signal of said summing amplifier (21) and speed data relating to the motion of a table (6) and said sensor (3), said correction values being fed to said computer (16) and a display unit (17), a second pick-up (24) mounted at a spacing from said first pick-up (10) having output being processed in a second selection stage (25) and fed together with signals of said first selection stage (14) to a blocking stage (26) which releases data flow between said memory (13) and said computer (16) only in the presence of a signal from said first selection stage (14) and the absence of a signal from said second selection stage (25).

6. The apparatus of claims 1 or 2, wherein said oscillation or acceleration pickup (10) is a microphone.

7. The apparatus of claims 1 or 2, wherein said oscillation or acceleration pickup (10) is a piezoelectric element.

8. The apparatus of claims 1 or 2, wherein said oscillation or acceleration pickup (10) is a capacitive transducer.

9. The apparatus of claims 1 or 2, wherein said oscillation or acceleration pickup (10) is an inductive transducer.

10. The apparatus of claims 1 or 2, wherein said oscillation or acceleration pickup is an optical transducer.

11. The apparatus of claims 1 or 2, wherein said oscillation or acceleration pickup (10) is positioned at an angle of 45° to the test axes of said sensor (3).

* * * * *